April 20, 1937.　　　F. L. MYERS　　　2,077,951
AIR FILTER
Filed June 4, 1935
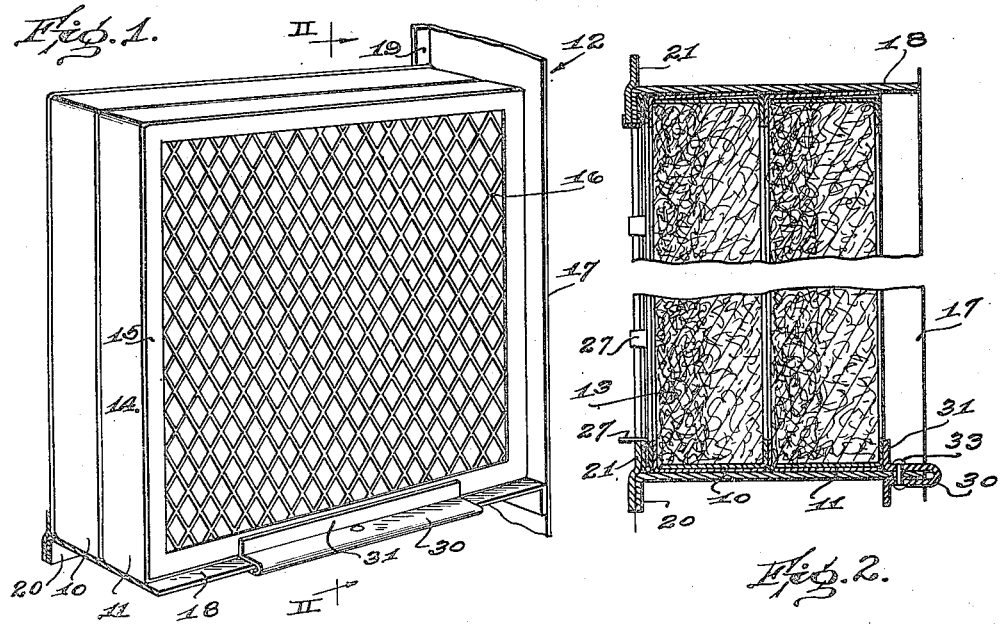
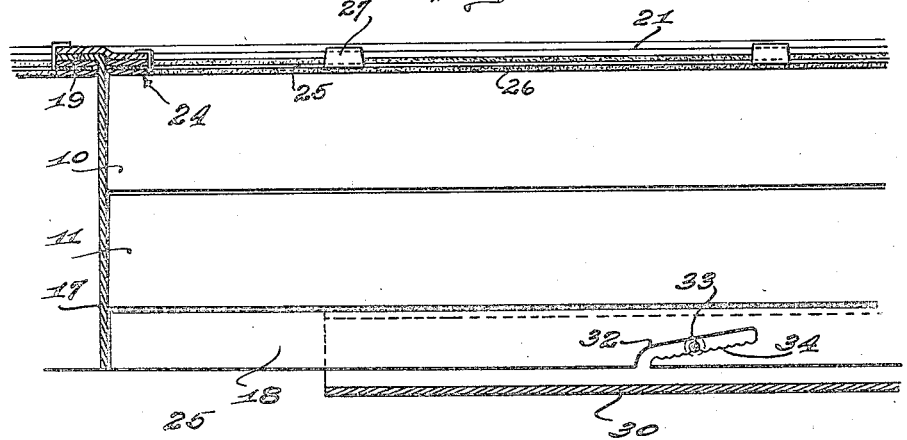
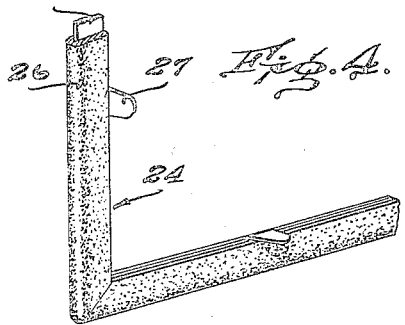
Frank L. Myers
INVENTOR.
BY J. F. Rule.
ATTORNEY Patented Apr. 20, 1937

2,077,951

UNITED STATES PATENT OFFICE 2,077,951

AIR FILTER

Frank L. Myers, Newark, Ohio, assignor to Owens-Illinois Glass Company, a corporation of Ohio Application June 4, 1935, Serial No. 24,859

3 Claims. (Cl. 183—49)

My invention relates to filter installations for use in filtering air and other gases.

An object of the invention is to provide an improved means for retaining filter units within the cells or framework in which they are installed, such retaining means being designed to facilitate the quick installation or removal of the filter units and also to securely hold them in position within the cells.

A further object of the invention is to provide an improved sealing means for preventing air leakage between the filter units and the walls of the cells in which they are installed.

Other objects of the invention will appear hereinafter.

In the accompanying drawing:

Fig. 1 is a perspective view showing a pair of filter units and a portion of the framework in which they are installed.

Fig. 2 is a transverse section at the line II—II on Fig. 1.

Fig. 3 is a fragmentary part sectional plan view.

Fig. 4 is a fragmentary perspective view of a sealing gasket.

Filter units 10 and 11, herein shown as of conventional construction, are mounted in a supporting framework 12. Each filter unit comprises a body 13 of fibrous material such, for example, as glass fibers in matted form and coated with an oily or viscous, dust-catching material. This body 13 may comprise comparatively coarse fibers forming the front or intake portion of the filter, and finer material comprising the rear portion of the filter. The filter body 13 is supported in a rectangular container 14 made of paper, cardboard or other suitable material. The front and rear faces of the filter may each be covered with a screen or grill 16 of openwork material surrounded by a frame 15 forming part of the container 14 in which the filter body is supported.

The framework 12 comprises vertical frame members 17 and horizontal frame members 18 which together provide rectangular cells to receive the filter units. The vertical members 17 have their rear marginal portions inturned to provide flanges 19. The horizontal frame members 18 are likewise provided with flanges 20. Metal strips 21 which may overlie the flanges 20 extend above the faces of the frame members 18 and also provide marginal flanges. These flanges 19, 20 and 21 provide bearing surfaces which extend along the marginal portions of a filter unit 10 when the latter is placed in position.

In order to prevent air leakage between the filter units and the surrounding cell walls, rectangular gaskets 24 are interposed between the filter units 10 and the stop flanges 19, 20, 21. The gasket may comprise a frame 25 consisting of a thin strip of sheet metal or other suitable material and a strip 26 of felt or like soft, compressible material adapted to form a seal. The gasket is provided with retaining tabs 27 which may be formed integral with the gasket frame 25. When the gasket is placed in position within the framework 12, the tabs are bent over the adjoining flanges of the framework, thereby removably securing the gaskets in position.

As shown, two filter units are placed in superposed relation in each cell, although either a single unit or more than two units can be installed in each cell, the depth of the cells and the thickness of the filter units being made to correspond with the number of units installed in each cell.

The units are retained in position by means of a retaining bar 30 which may be made of sheet metal and comprises a U-shaped body which slidably engages the front margin of the horizontal frame member 18, and an upturned flange 31 adapted to bear against the upper margin or flange 15 of the filter unit. The frame member 18 is formed with a slot 32 extending inwardly from the front edge of the frame member and diagonally thereof, as shown in Fig. 3, so that said slot forms an acute angle with said front edge. A holding pin 33 extending through the body 30 and the retaining strip, centrally thereof, and riveted or otherwise secured thereto, is adapted to enter the slot 32, thereby holding the retaining strip in position to bear against the front face of the filter unit. The forward edge of the slot 32 is formed with corrugations or teeth 34 which are preferably in the form of rounded lugs adapted to securely hold the retaining strip against accidental movement.

The slot 32 is inclined at an angle such that when the retaining strip is placed in position for the pin 33 to engage the slot, and then shifted lengthwise, it is cammed or wedged inward in a manner to clamp the filter unit and hold it securely in the frame and in snug contact with the sealing gasket. The corrugations 34 effectually prevent any accidental shifting of the retaining bar which would loosen the filter unit, while at the same time permitting instantaneous removal of said bar when it is desired to remove the filter units for replacement or other purpose.

Modifications may be resorted to within the spirit and scope of my invention.

I claim:

1. The combination of a framework comprising a cell to receive a filter unit, a retaining strip for holding a filter unit within the cell, said retaining strip comprising a U-shaped body to embrace the front marginal portion of a cell wall, said portion being formed with a slot opening inward from the front edge thereof and extending laterally at an acute angle to said edge, the front edge of the slot being formed with a series of teeth or corrugations, and a cooperating holding pin secured to the retaining strip and adapted to enter said slot.

2. The combination of a filter unit, a supporting framework comprising a cell within which the unit is mounted, said framework including walls defining and extending substantially at right angles to the face of said cell and filter unit, one of said walls having a slot therethrough extending inwardly from and at an angle to the front edge of said wall, a retaining strip adapted to bear against the front face of the filter unit, and a pin in said strip fitting in and coacting with said slot, whereby lengthwise movement of the retaining strip will cam it inward into clamping engagement with the filter unit.

3. In a battery of filter unit cells having an interjacent wall common to and between each pair of adjacent cells within which are mounted individual filter units, a retaining strip comprising a U-shaped body embracing the front marginal edge of said wall, two flanges on said U-shaped body, one of said flanges attached to each of the free-ends of said U-shaped member on opposite sides of said wall, each of said flanges adapted to bear against the front face of its adjacent filter unit respectively, said interjacent wall having a slot therethrough opening inwardly from the front edge thereof and extending laterally at an acute angle to said edge, and a cooperating pin secured to the retaining strip and adapted to enter said slot and cam said retaining strip inwardly into clamping engagement with each of said adjacent filter units.

FRANK L. MYERS.